N. I. DRYFOOS.
SOLDERING IRON.
APPLICATION FILED APR. 26, 1911.
1,020,971.
Patented Mar. 26, 1912.
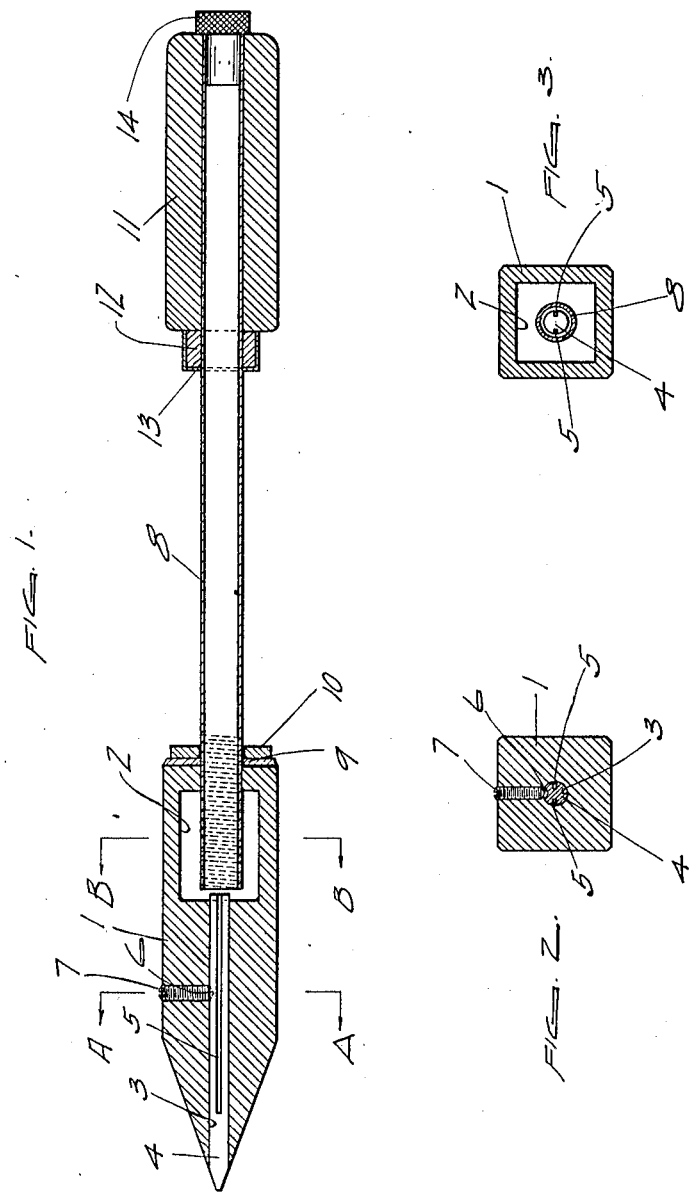

UNITED STATES PATENT OFFICE.

NATHAN I. DRYFOOS, OF CLEVELAND, OHIO.

SOLDERING-IRON.

1,020,971.  Specification of Letters Patent.  Patented Mar. 26, 1912.

Application filed April 26, 1911. Serial No. 623,381.

*To all whom it may concern:*

Be it known that I, NATHAN I. DRYFOOS, a citizen of the United States, and a resident of Cleveland, county of Cuyahoga, and State of Ohio, have invented a new and useful Improvement in Soldering-Irons, of which the following is a specification, the principle of the invention being herein explained and the best mode in which I have contemplated applying the principle, so as to distinguish it from other inventions.

The present invention relates to soldering tools, and its general object is the provision of a soldering iron within which the solder may be placed and from which the flow of melted solder will be so controlled that too great an amount will not be discharged at the point of application.

To the accomplishment of this and related objects, said invention, then, consists of the means hereinafter fully described and particularly pointed out in the claims.

The annexed drawing and the following description set forth in detail certain mechanism embodying the invention, such disclosed means constituting, however, but one of the various mechanical forms in which the principle of the invention may be employed.

In said annexed drawing:—Figure 1 is a longitudinal section of my improved iron; Fig. 2 is a cross section on the line A—A in Fig. 1, and Fig. 3 is a cross section on the line B—B in Fig. 1.

The iron comprises primarily a head 1 which will ordinarily, in accordance with common usage, be formed of copper. Within the head 1 is formed a chamber 2, and a bore 3 extends from the chamber 2 to the exterior of the head, preferably to the point of the head. Within the bore 3 is tightly fitted a pin 4. I have found that it is preferable, though not necessary, to form this pin 4 of copper and to have its surface tinned. The pin is also preferably, though not necessarily, provided with one or more grooves 5 extending longitudinally along the pin, but not throughout its length. In practice also it has been found at times desirable to allow a slight movement of the pin in the bore 3, though this will not be a free movement due to the fit of the pin within the bore. A convenient manner of providing for alternatively fixedly securing the pin, or allowing limited movement thereof, is to provide a recess 6 in the pin, which recess is engaged by a set-screw 7. When the set-screw is in its innermost position, as in Fig. 1, obviously the pin is fixedly secured in the head, but when the set-screw 7 is raised, as in Fig. 2, the pin is allowed a very slight to and fro movement, it being understood that in the form shown in the drawings the recess and the head of the set-screw are conical in form.

A tubular handle 8 is screw-threaded into the rear end of the head 1 and opens freely into the chamber 2, and an asbestos packing 9 is secured around the junction of the handle with the head by a nut 10. On the outer end of the handle 8 is a hand-piece 11, preferably wood, and an asbestos packing 12 is secured by a ferrule 13 on the handle 8 adjacent the hand-piece 11. The outer end of the handle 8 may be closed by a screw plug 14.

In operation, a stick of solder is inserted within the tubular handle, after which an air-tight closure of the outer end of the handle is made by screwing in the plug 14. Heat being applied to the chambered head, the solder within the handle, adjacent the head, melts, and when the tool is held in a slightly inclined position the solder runs into the chamber, and as the chamber is air-tight, the solder, as it runs in, compresses the air within the chamber. Obviously, if no means of exit is provided from the air-tight chamber the tool would be useless, and equally obvious, if the necessary means for the exit of solder also allowed exit of air, then the desired air compression within the chamber could not take place. But the pin leading from the chamber to the point of the iron, although it prohibits the passage of air from the chamber, allows the molten solder to "sweat" through along its surface until it finally arrives at the point of application at the point of the iron. It has been found in actual practice, that this flow of solder by "sweating" is aided by tinning the surface of the pin whereby the solder tends to flow or "sweat" along such surface, and it is also aided by grooving the pin, but, of course, in order to maintain the air-tight closure of the chamber, this grooving must not extend throughout the length of the pin. It has also been found in practice that the flow is occasionally helped by allowing a slight movement of the pin in its bore, and this I have provided for by means of the set-screw or its equivalent. Therefore, it will be seen that when the iron is in operation and the solder is flowing, it is entering the chamber in the head against an air cushion which will be formed an instant after the solder first starts by the compression of the air therein by the flow of solder. The limited relief of this pressure by the exit of molten solder which "sweats" along the pin, allows the continued flow of solder from the handle into the chamber, but because the solder flows against the air cushion, its flow is gradual and may be said to be self-controlling. In other words, the supply in the chamber will only be added to as the pressure therein is relieved by the use of solder "sweating" along the pin, and hence an excess of molten solder is not delivered into the chamber, and hence to the point of application.

It is essential, of course, that after the flow of solder into the chamber starts, the chamber shall be air-tight. It is not necessary, however, to close the outer end of the handle, because as soon as the molten solder covers the inner end of the handle, the solder itself makes an air-tight closure of the chamber. The term "air-tight chamber" in the claims is used in this sense, that is, it means not necessarily a permanently air-tight chamber, but one which is air-tight during operation, whether made so by a closing member or by the solder itself.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. A soldering tool, comprising a head provided with a chamber, said chamber being air-tight during operation of said tool, and a longitudinally grooved pin secured in said head and leading from said chamber to the exterior of said head.

2. A soldering tool, comprising a head provided with a chamber, said chamber being air-tight during operation of said tool, and a tinned copper pin secured in said head and leading from said chamber to the exterior of said head, said pin being longitudinally grooved.

3. A soldering tool, comprising a head provided with a chamber, said chamber being air-tight during operation of said tool, a longitudinally grooved pin secured in said head and leading from said chamber to the exterior of said head, and a tubular handle opening into said chamber.

4. A soldering tool, comprising a head provided with a chamber, said chamber being air-tight during operation of said tool, a longitudinally grooved pin secured in said head and leading from said chamber to the exterior of said head, means for allowing longitudinal movement of said pin, and a tubular handle opening into said chamber.

5. A soldering tool, comprising a head provided with a chamber, said chamber being air-tight during operation of said tool, a longitudinally grooved pin secured in said head and leading from said chamber to the exterior of said head, a set screw adapted alternatively to fixedly secure said pin or to allow limited longitudinal movement thereof, and a tubular handle opening into said chamber.

6. A soldering tool, comprising a head provided with a chamber, said chamber being air-tight during operation of said tool, a tinned copper pin secured in said head and leading from said chamber to the exterior of said head, means for alternatively fixedly securing said pin or allowing limited longitudinal movement thereof and a tubular handle opening into said chamber.

Signed by me this 24th day of April, 1911.

NATHAN I. DRYFOOS.

Attested by—
ROBERT M. SEE,
JNO. F. OBERLIN.

---

Copies of this patent may be obtained for five cents each, by addressing the "Commissioner of Patents, Washington, D. C."